United States Patent
Rottenstreich

(10) Patent No.: US 9,900,903 B1
(45) Date of Patent: Feb. 20, 2018

(54) WEIGHTED PERIODIC SCHEDULING OF A SHARED RESOURCE

(71) Applicant: Marvell Israel (M.I.S.L) Ltd., Yokneam (IL)

(72) Inventor: Ori Rottenstreich, Kiriat Motzkin (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 118 days.

(21) Appl. No.: 14/595,999

(22) Filed: Jan. 13, 2015

Related U.S. Application Data

(60) Provisional application No. 61/926,771, filed on Jan. 13, 2014.

(51) Int. Cl.
  *H04J 1/16* (2006.01)
  *H04W 72/12* (2009.01)
  *H04J 3/16* (2006.01)

(52) U.S. Cl.
  CPC .......... *H04W 72/1263* (2013.01); *H04J 3/16* (2013.01)

(58) Field of Classification Search
  None
  See application file for complete search history.

(56) References Cited

U.S. PATENT DOCUMENTS

| | | | |
|---|---|---|---|
| 4,855,996 A * | 8/1989 | Douskalis | H04J 3/1629 370/545 |
| 5,774,668 A | 6/1998 | Choquier et al. | |
| 5,951,694 A | 9/1999 | Choquier et al. | |
| 6,469,982 B1 * | 10/2002 | Henrion | H04L 12/5602 370/230 |
| 7,165,252 B1 * | 1/2007 | Xu | G06F 9/4887 718/100 |
| 7,443,790 B2 | 10/2008 | Aicklen et al. | |
| 7,502,358 B1 * | 3/2009 | Kopikare | H04W 74/06 370/346 |
| 8,547,984 B2 | 10/2013 | Eberle et al. | |

(Continued)

FOREIGN PATENT DOCUMENTS

EP          1133109 A1 *  9/2001  ............. H04L 47/10

OTHER PUBLICATIONS

WO 99/09689 (PCT/US98/14893); Ruszcyk, "System, Device, and Method for Scheduling in a Communication Network".*

(Continued)

*Primary Examiner* — Kwang B Yao
*Assistant Examiner* — Juvena Loo

(57) ABSTRACT

Packets received by a network device are assigned to packet flows defined by shared packet characteristics. The packet flows belong to a first category containing packet flows that are to be granted access to the shared resource periodically and with a fixed time interval between subsequent grants of access to the shared resource, or a second category containing packet flows not included in the first category. A periodic schedule that allocates the shared resource to the packet flows in the first category is determined. The periodic schedule includes one or more empty time slots during which the shared resource is not granted to any packet flow in the first category. Access to the shared resource is granted to packet flows in the first category according to the periodic schedule, and is granted packet flows in the second category during the empty time slots in the periodic schedule.

20 Claims, 4 Drawing Sheets

(56) References Cited

U.S. PATENT DOCUMENTS

| | | | |
|---|---|---|---|
| 8,725,873 B1 | 5/2014 | Bromberg | |
| 2002/0176431 A1 | 11/2002 | Golla et al. | |
| 2004/0156387 A1* | 8/2004 | Shapira | H04B 7/2123 370/443 |
| 2007/0086471 A1* | 4/2007 | Igarashi | H04W 72/10 370/412 |
| 2010/0046537 A1 | 2/2010 | Perlmutter et al. | |
| 2010/0260153 A1* | 10/2010 | Hollick | H04L 12/5695 370/336 |
| 2011/0026541 A1 | 2/2011 | Beshai | |
| 2011/0161963 A1* | 6/2011 | Guevorkian | G06F 9/4887 718/102 |

OTHER PUBLICATIONS

Bar-Noy et al., "Efficient algorithms for periodic scheduling," Computer Networks, vol. 45, No. 2, pp. 155-173 (2004).

Bar-Noy et al., "Minimizing Service and Operation Costs of Periodic Scheduling," Mathematics of Operations Research, vol. 27. No. 3, pp. 518-544 (2002).

Choy et al., "Huffman Fair Queueing: A scheduling algorithm providing smooth output traffic," IEEE International Conference on Communications, 2006, pp. 796-799 (2006).

Kazan et al., "Balancing perfectly periodic service schedules: An application from recycling and waste management," Naval Research Logistics (NRL), vol. 59, No. 2, pp. 160-171 (2012).

Park et al., "Technical Note—Optimal Scheduling of Periodic Activities," Operations Research, vol. 33, No. 3, pp. 690-695 (1985).

Shin, "Automated Generation of Round-Rogin Arbitration and Crossbar Switch Logic," School of Electrical and Computer Engineering, Georgia Institute of Technology, 135 pages (Nov. 2003).

Shreedhar et al., "Efficient Fair Queueing using Deficit Round Robin," ACM SIGCOMM '95, pp. 231-242 (1995).

"Wavefront arbiter," Wikipedia, http://en.wikipedia.org/wiki/Wavefrontsub.--arbiter, last modified Mar. 15, 2010, 2 pages.

Campbell, et al., "Vehicle minimization for periodic deliveries," *European J. of Operational Research*, vol. 165, No. 3, pp. 668-684 (2005).

Chuanxiong, "SRR: An O(1) Time Complexity Packet Scheduler for Flows in Multi-Service Packet Networks," *SIGCOMM '01*, pp. 211-222 (Aug. 2001).

Khanna, et al., "On Indexed Data Broadcast," *University of Pennsylvania Scholarly Commons, Dept. of Computer & Information Science*, 21 pages. (Jun. 1, 2000).

Michelon, et al., "On a class of periodic scheduling problems: models, lower bounds and heuristics," *Proc. on Int'l Multiconference on Computer Science and Information Technology (IMCSIT)*, vol. 3, pp. 899-906 (2008).

Parekh, et al., "A Generalized Processor Sharing Approach to Flow Control in Integrated Services Networks: The Single-Node Case," *IEEE/ACM Trans. on Networking*, vol. 1, No. 3, pp. 344-357 (Jun. 1993).

* cited by examiner

WEIGHTED PERIODIC SCHEDULING OF A SHARED RESOURCE

CROSS-REFERENCE TO RELATED APPLICATIONS

This claims the benefit of U.S. Provisional Patent Application No. 61/926,771, entitled "Weighted Periodic Scheduling of a Shared Resource" and filed on Jan. 13, 2014, the disclosure of which is hereby incorporated herein by reference in its entirety.

FIELD OF THE DISCLOSURE

The present disclosure relates generally to networks and, more particularly, to scheduling techniques implemented in network devices.

BACKGROUND

Network devices often include and/or utilize shared resources, such as ports shared by multiple packet flows, such as flows corresponding to different packet classes. The shared resource can typically be accessed by only one user of the shared resource, such as only one packet flow, at any given time. A scheduler is typically coupled to the shared resource and is responsible for scheduling and granting access to the shared resource to the users of the shared resource. Some users of the shared resource require or desire periodic scheduling in which a fixed time interval needs to be maintained between two consecutive accesses to the shared resource. Other users of the shared resource, such as other packet flows, do not have the periodic and/or fixed time interval requirement.

Many network devices are configured to provide different quality of service (QoS) or priority levels for different types/classes of traffic. When processing packets associated with a particular traffic class, for example, a network device may ensure that transmission latency is below a certain threshold, ensure that the drop/loss rate is below a certain threshold, apply "best efforts," etc. The QoS level for a particular packet can be important, for example, when multiple packets are to be granted access to a shared resource, such as when the packets are to be forwarded to single egress port of a network device (e.g., a bridge), and therefore must contend for access to the egress port. In some network devices, each egress port is associated with multiple queues associated with various QoS levels, and a scheduler determines the order in which packets associated with the different queues/QoS levels are sent to the egress port for transmission over the network.

SUMMARY

In an embodiment, a method for allocating a shared resource in a network device includes receiving a stream of packets at the network device, and assigning the packets to packet flows defined by shared packet characteristics, ones of packet flows belonging to (i) a first category containing packet flows that are to be granted access to the shared resource periodically and with a fixed time interval between subsequent grants of access to the shared resource, or (ii) a second category containing packet flows not included in the first category. The method also includes determining a periodic schedule that allocates the shared resource to the packet flows in the first category, the periodic schedule (i) defining a period of fixed number of time slots between subsequent accesses to the shared resource granted to a same packet flow in the first category and (ii) including one or more empty time slots during which the shared resource is not granted to any packet flow in the first category. The method additionally includes granting access to the shared resource to packet flows in the first category according to the periodic schedule, and granting access to the shared resource to packet flows in the second category during the empty time slots in the periodic schedule.

In another embodiment, a network device comprises an ingress port configured to receive a stream of packets, and a packet classifier module configured to assign the packets to packet flows defined by shared packet characteristics, ones of packet flows belonging to (i) a first category containing packet flows that are to be granted access to the shared resource periodically and with a fixed time interval between two subsequent grants of access to the shared resource, or (ii) a second category containing packet flows not included in the first category. The network device additionally comprises a scheduler module configured to determine a periodic schedule that allocates the shared resource to the packet flows in the first category, the periodic schedule (i) defining a period of fixed number of time slots between subsequent accesses to the shared resource granted to a same packet flow in the first category and (ii) including one or more empty time slots during which the shared resource is not granted to any packet flow in the first category. The scheduler module is also configured to grant access to the shared resource to packet flows in the first category according to the periodic schedule, and grant access to the shared resource to packet flows in the second category during the empty time slots in the periodic schedule.

In yet another embodiment, a method for allocating a shared resource in a network device includes determining a periodic schedule that allocates the shared resource to a plurality of clients, the periodic schedule (i) defining a period of fixed number of time slots between subsequent accesses to the shared resource by a same client of the plurality of clients and (ii) including at least some empty time slots during which access to the shared resource is not granted to any client of the plurality of clients. The method also includes granting access to the shared resource to ones of the plurality of clients according to the determined periodic schedule.

In still another embodiment, a network device comprises a shared resource and a scheduler module coupled to the shared resource. The scheduler module configured to determine a periodic schedule that allocates the shared resource to a plurality of clients, the periodic schedule (i) defining a period of fixed number of time slots between subsequent grants to a same client of the plurality of clients and (ii) including at least some empty time slots during which the resource is not granted to any client of the plurality of clients. The scheduler module is also configured to grant access to the shared resource to ones of the plurality of clients according to the determined periodic schedule

DETAILED DESCRIPTION

Figure 1:
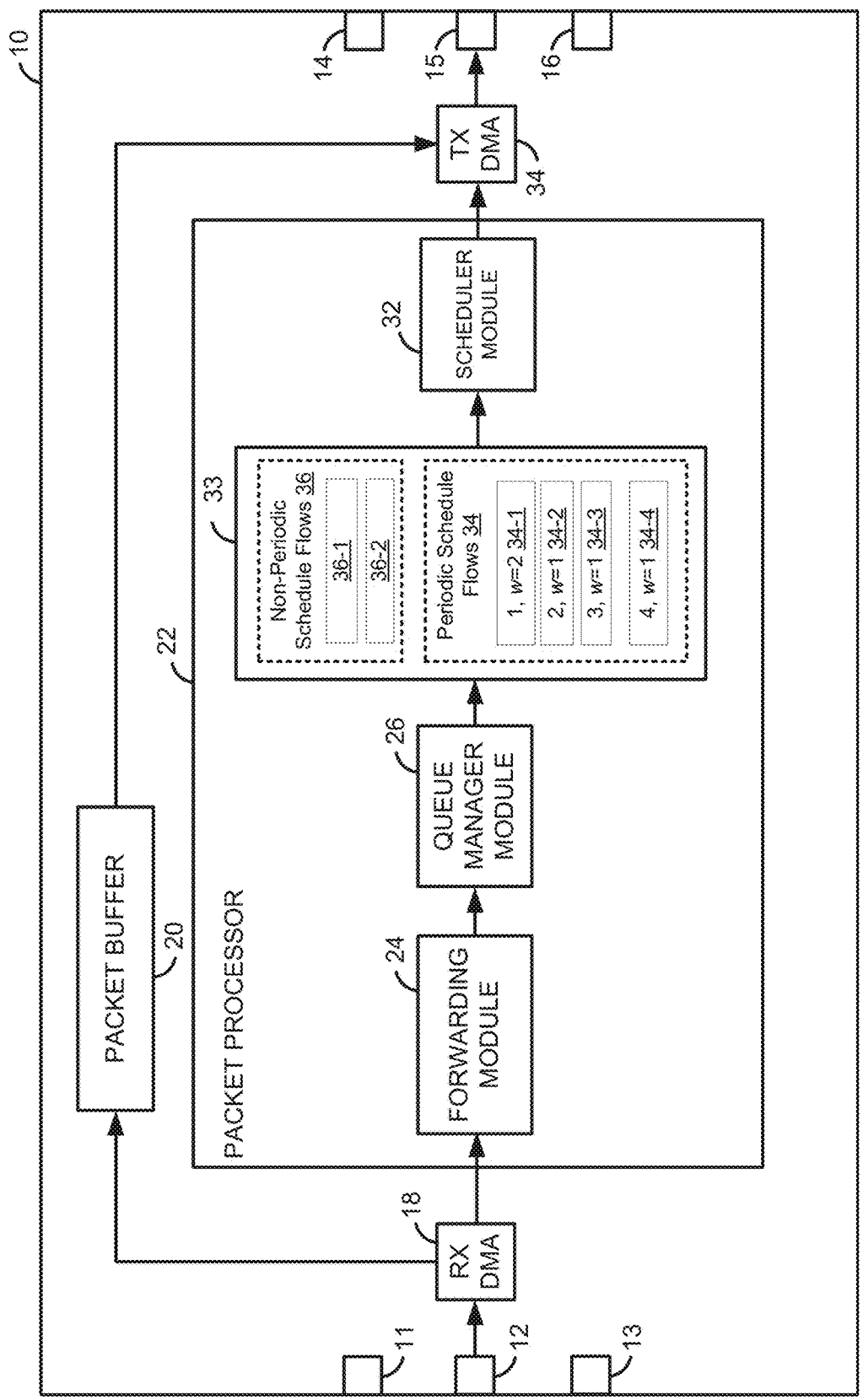
FIG. 1 is a block diagram of an example network device in which scheduling techniques of the present disclosure are implemented, according to an embodiment.

Example shared resource scheduling methods and apparatus for scheduling access to a shared resource are described herein. Example shared resource scheduling methods and apparatus are described herein in the context of network devices. It is noted however, in light of the disclosure and teachings herein, that similar methods an apparatus for scheduling of a shared resource are suitable wherever several clients, such as cores, processors, processing applications, packet flows, etc., need to gain access to a shared resource, and wherein only one client can gain access to the shared resource at any given time. The described shared resource scheduling methodologies are not limited to use in communication network devices, but rather may be utilized in other suitable contexts as well.

In embodiments described below, a scheduler of a network device (e.g., a bridge device, router device, switch device, or any other suitable network device) determines a periodic schedule that allocates a shared resource to a plurality of "users" or "clients" of the shared resource, wherein only one user can access the shared resource at any given time. As merely an example, in an embodiment, the shared resource is an egress port of the network device, and the plurality of users includes packet flows to be transmitted via the egress port of the network device. As another example, in another embodiment, the shared resource is a shared memory included in or coupled to the network device, and the plurality of users includes a plurality of processing cores configured to access the shared memory, or a plurality of applications, within a single processing core, configured to access the shared memory.

In an embodiment, the scheduler supports at least users that belong to a first category of users. The first category of users consists of users which require or desire scheduling with a fixed period of time between subsequent accesses granted to a same user of the shared resource. In an embodiment, the scheduler determines a periodic schedule to accommodate users in the first category. The periodic schedule defines fixed intervals between subsequent accesses to the shared resource by ones of users in the first category, in an embodiment. To ensure that the users in the first category gain access to the shared resource with fixed time intervals between subsequent accesses to the shared resource, the scheduler utilizes empty time slots in which the shared resource is not allocated to any of the users in the first category, as will be explained in more detail below, in an embodiment.

In an embodiment, the scheduler also supports users that belong to a second category of users. The second category of users consists of users that do not require or desire periodic access to the shared resource with fixed time intervals between subsequent accesses to the shared resource, in an embodiment. In an embodiment, the scheduler grants access to the shared resource to users in the second category during the empty time slots of a periodic schedule determined to accommodate users in the first category. Allocating, to ones of users in the second category, empty time slots of the periodic schedule determined for ones of users of the first category diminishes or eliminates inefficiency caused by the empty time slots needed to accommodate fixed interval access to the shared resource required or desired by the users in the first category, in at least some embodiments.

FIG. 1 is a highly simplified block diagram of an example network device 10 in which scheduling techniques of the present disclosure are implemented, according to an embodiment. In various embodiments, the network device 10 is a bridge device, router device, switch device, or any other suitable network device configured to operate within a networked environment. The network device 10 shown in the embodiment of FIG. 1 includes at least ports 11-16. In some embodiments, each of ports 11-16 is a bidirectional port that can act as either an ingress port or an egress port. In other embodiments, ports are dedicated to be either ingress ports or egress ports. For instance, each of ports 11-13 is a dedicated ingress port and each of ports 14-16 is a dedicated egress port, in an embodiment. While FIG. 1 only shows six ports, in other embodiments network device 10 includes more than six ports or fewer than six ports. Generally speaking, the network device 10 receives a stream of packets via an ingress port 11, 12, 13, determines one or more egress ports 14, 15, 16 via which to transmit the packet, and transmits the packet via the determined one or more egress ports 14, 15, 16, in an embodiment.

In an embodiment, the network device 10 is configured to support a plurality of packet flows that traverse the network device 10. A packet flow is defined by one or more properties or characteristics shared by packets that belong to the packet flow, in an embodiment. For example, packets that belong to a particular packet flow share one or more of a media access source address (MAC SA), a media access destination address (MAC DA), a service virtual local access network identity (S-VID), etc., in an embodiment. Additionally, in an embodiment, a packet flow is associated with one or several priority levels corresponding to particular traffic classes. For example, voice over internet protocol (VoIP) packets are assigned to a higher priority level relative priority levels assigned to other packets, such as "best effort" delivery traffic, for instance internet browsing or downloading, in an embodiment.

The network device 10 includes a plurality of egress queues 33 coupled to a scheduler module 32. The queues 33 correspond to the egress port 15 and are used to store packets to be transmitted via the port 15, in an embodiment. Ones of queues 33 are associated with respective packet flows. For ease of explanation, as used herein, the terms "queue(s)", "packer flow(s)" "flow(s)" are sometimes used interchangeably to refer to packet flows, or queues corresponding to the packet flows, for which the scheduler module 32 controls access to the shared egress port 15. In an embodiment, the queues 33 include a first group of queues 34 used for storing packets that belong to packet flows of a first category of packet flows. In an embodiment, the first category of packet flows includes packet flows that require or desire periodic transmission from the port 15 with fixed periods of time between transmission of consecutive packets corresponding to a particular packet flow of the first category. The queues 33 also include a second group of queues 36 used for storing packets that belong to packet flows of a second category. In an embodiment, the packet flows of the first category include packet flows having one or more relatively higher priority levels. For example, packet flows of the first category include low latency packet flows and/or guaranteed delivery packet flow, such as, for example, packet flows that carry VoIP packets, packet flows that correspond to a guaranteed quality of service (QoS), etc., in an embodiment. The packet flows of the second category include packet flow that do not have a period and/or fixed interval transmission of the packets from the port 15, in an embodiment. In an embodiment, the packet flows of the second category include packet flows having one or more lower priority levels relative to the one or more priority levels of the packet flows of the first category. For example, packet flows in the second category include "best effort" packet flows, in an embodiment.

In an embodiment, the scheduler module 32 determines a periodic schedule for transmission of packets from the queues in the first group 34. In an embodiment, the scheduler 32 determines a weighted schedule in which different ones of the queues 34 are allocated respective numbers of time slots within a period of the periodic schedule according to a weighting factor, or "weights", associated with the ones of the queues 34. For example, in the embodiment illustrated in FIG. 1, a queue 34-1 is assigned a weighting factor w=2, and each of queues 34-2, 34-3, and 34-4 is assigned a weighting factor w=1. Accordingly, the scheduler module 32 determines a periodic schedule for de-queueing packets from the queues 34 that includes two packets de-queued from the queue 34-1, and one packet de-queued from each of the queues 34-2, 34-3, 34-4, in a single period of the periodic schedule, in this embodiment.

In an embodiment, in at least some scenarios, the periodic schedule determined by the scheduler module 32 for the group of queues 34 includes one or more empty time slots, or time slots during which the port 15 is not allocated for transmission of packets from any of the queues 34. As will be explained in more detail in connection with an example embodiment and scenario illustrated in FIG. 2, the empty time slots are needed to ensure fixed time intervals between consecutive transmission of packets from any particular queue 34, in at least some embodiments and scenarios. In an embodiment, the scheduling mode 32 is configured to allocate the empty time slots in the periodic schedule to transmission of packets from queues 36 that do not require periodic and/or fixed time interval scheduling. Scheduling transmission of packets from queues 36 corresponding to non-periodic packet flows during empty time slots of a periodic schedule determined for transmission of packets from the queues 34 diminishes or eliminates inefficiency that results from empty time slots in system in which the empty time slots are not allocated to non-periodic packet flows, in at least some embodiments.

In the example embodiment of FIG. 1, ingress port 12 is coupled to a receive-side direct memory access (Rx DMA) 18. Rx DMA 18 is configured to write packets received via ingress port 12 to a packet buffer 20. In some embodiments, network device 10 includes one or more other Rx DMAs coupled to one or more respective ingress ports (e.g., ports 11 and 13, and/or one or more ports not seen in FIG. 1). Additionally or alternatively, in some embodiments, Rx DMA 18 is a channelized Rx DMA associated with a group of two or more ports (that is, ingress port 12 and one or more other ports), where each port within the group is associated with a different DMA context. In various embodiments, packet buffer 20 is a random access memory (RAM), or any other suitable type of memory.

In an embodiment, Rx DMA 18 extracts headers (and/or other portions) of packets received at ingress port 12 and provides the headers to a packet processor 22. In an alternative embodiment, packet processor 22 includes a module (not seen in FIG. 1) that extracts the packet headers and/or other packet portions. In some embodiments, packet processor 22 uses the headers and/or other packet portions to generate descriptors representing the packets, and processes the descriptors at a forwarding module 24 to make forwarding decisions for respective packets. In various embodiments, forwarding module 24 uses destination address information, such as media access control (MAC) destination addresses of packets, as indices/keys to a forwarding database (e.g., a database stored in a ternary content addressable memory (TCAM), a static random access memory (SRAM), a dynamic random access memory (DRAM) or another suitable type of memory) in order to determine the egress ports to which the packets are to be forwarded. In an embodiment, forwarding module 24 modifies each descriptor to reflect the respective forwarding decision.

In an embodiment, the forwarding module 24 provides the descriptor(s) to a queue manager module 26 managing queues 33. In an embodiment, queues 33 are buffers (e.g., first-in-first-out (FIFO) buffers) configured to store descriptors from forwarding module 24. In various embodiments, queues 33 are implemented in SRAM, DRAM, or any other suitable type of memory. In some embodiments, packet processor 22 determines the traffic class of each packet, and/or modifies the corresponding descriptor to reflect the traffic class of the packet, before the descriptor is sent to queue manager module 26. In various embodiments, for example, this packet classification is performed by forwarding module 24, and/or by another module of packet processor 22 not seen in FIG. 1. While FIG. 1 only shows the path for traffic that is received at ingress port 12 and forwarded to egress port 15, it is noted that, in some embodiments and/or scenarios, at least some of the queues 30-1 through 30-M also buffer descriptors corresponding to traffic from other ingress ports (e.g., from port 11, port 13, and/or one or more other ports not seen in FIG. 1).

When one of queues 33 is "de-queued," in an embodiment, one or more descriptors from the queue are sent to a transmit-side DMA (Tx DMA) 34 associated with egress port 15. In an embodiment, Tx DMA 34 is configured to retrieve/read packets, stored in packet buffer 20, that correspond to the descriptors received from queues 33, and to provide the retrieved packets to egress port 15. In an embodiment, network device 10 also includes one or more other Tx DMAs coupled to one or more respective egress ports (e.g., port 14, port 15, and/or one or more ports not seen in FIG. 1). In some embodiments, each Tx DMA of network device 10 is associated with a single port. In other embodiments, a channelized Tx DMA is associated with a group of ports, with each port being associated with a DMA context.

In an embodiment, packet processor 22 includes, or is included in, one or more tangible/physical processors of network device 10 that collectively implement multi-core processing. In an embodiment, the one or more physical processors are configured to read and execute software or firmware instructions stored on a tangible, non-transitory, computer-readable memory (e.g., a magnetic disk, optical disk, read-only memory (ROM), random access memory (RAM), etc.), the processor(s) being configured to execute the instructions to perform packet processing operations based on a processing context. In some embodiments, the software or firmware instructions include computer-readable instructions that, when executed by the processor(s), cause the processor(s) to perform any of the various actions of packet processor 22 described herein. In one such embodiment, forwarding module 24, queue manager module 26, and/or scheduler module 32 are implemented as respective software or firmware modules, with each module corresponding to instructions executed by packet processor 22. In this embodiment, the order of forwarding module 24, queue manager module 26, and/or scheduler module 32 shown in FIG. 1 corresponds only to orders of operation rather than physical locations (e.g., rather than location within a hardware pipeline).

Figure 2:
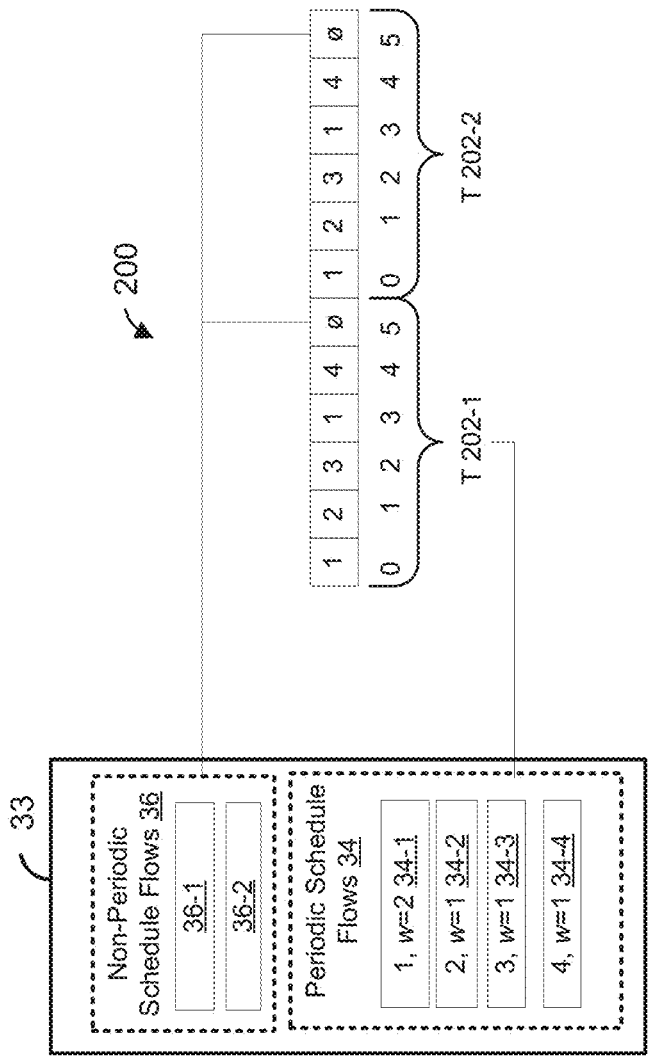
FIG. 2 is a block diagram of an example schedule for granting access to a shared resource to a plurality of users, such as packet flows, according to an embodiment.

FIG. 2 is a diagram illustrating an example schedule 200 determined by the scheduler module 32 for schedules access to the port 15 by the queues 33, according to an example embodiment and scenario. Generally, each period of a periodic schedule determined for schedules access to the port 15 the periodic queues 34, according to the respective weights assigned to the queues 34 as illustrated in FIG. 2, would require at least five time slots such that two time slots are allocated for transmission of packets from the queue 34-1, and one time slot is allocated for transmission of packets from each of the queues 34-2, 34-3, and 34-4. However, five time slots in a single period of the periodic schedule cannot accommodate the fixed interval requirement for transmission of consecutive packets from one of the queues 34, in this embodiment. Rather, at least six time slots are needed to satisfy the fixed interval requirement, in the illustrated embodiment. In the example illustrated in FIG. 2, two periods of the schedule 200 are shown. Each period of the schedule 200 includes six time slots, numbered 0 through 5, in which the time slots 0 and 3 are allocated to the queue 34-1, the time slot 1 is allocated to the queue 34-2, the time slot 2 is allocated to the queue 34-3, and the time slot 4 is allocated to the queue 34-4. Time slot 5 is an empty time slot that is not allocated to any of the queues 34, in the illustrated embodiment. The empty time slot 5 is needed to main fixed interval (3 time slots) between consecutive accessed to the port 15 by the queue 34-1, in the illustrated embodiment.

With continued reference to FIG. 2, in an embodiment, the scheduler module 32 schedules access to the port 15 to queues 36 during the empty time slots of the schedule 200. As just an example, the scheduler module 32 schedules access to the port 15 to the queue 36-1 during the time slot 5 of the first period 202-1 of the periodic schedule 200, and schedule access to the port 15 to the queue 36-2 during the time slot 5 of the second period 202-2 of the period schedule 200, in an example embodiment. In other embodiments, the scheduler module 32 allocates at least some of the empty time slots in the period schedule 200 to the non-periodic queues 36 in other suitable manners.

In various embodiments, the scheduler module 32 is configured to determine a periodic schedule with a minimal time period and/or with a minimal number of empty time slots in the periodic schedule, while accommodating the requirement that each periodic packet flow 34 is granted access to the port 15 exactly a number of times corresponding to the weight associated with the packet flow and with a fixed time interval between two consecutive grants of access to the port 15 by the packet flow 34. As referred to herein, determining the periodic schedule comprises solving a minimal length pure periodic scheduling (MLPPS) problem, in various embodiments. Minimizing a length of a time period of the periodic schedule allows the network device 10 to better serve relatively higher priority packet flows associated with the periodic queue 34, in an embodiment. In an embodiment, the scheduler module 32 determines a periodic schedule so as to minimize the number of empty time slots in the periodic schedule by determining an optimal period Topt that accommodates weighted periodic fixed interval access requirements of the periodic packet flows, in isolation from considering the scheduling requirements of non-periodic schedule flows 36. Let k be the number of flows and let $W=\{w_1, \ldots, w_k\}$ be a set of k positive integer weights describing the number of times that each of the flows has to be served in each time period. The MLPPS problem can be defined as determining a periodic schedule with a time period composed of T time slots. In each time slot, either exactly one of the flows is scheduled or "served" or the time slot is an empty time slot in which none of the flows is served, in an embodiment. Solving the MLPPS problem comprises determining a time period with a minimal number T of time slots, in an embodiment. In an embodiment, a schedule $S=(S_0, S_1, \ldots, S_{T-1})$ where $S_i \in \{\emptyset, 1, \ldots, k\}$ describes the number of the flow that is served in the i-th time slot (the symbol $\emptyset$ stands for an empty time slot). According to an embodiment, a schedule that constitutes a valid solution to the MLPPS problem has the following properties:

(i) Each flow $j \in [1, k]$ is served exactly $w_j$ times, i.e. $\Sigma_{i=0}^{T} I(S_i=j)=w_j$, where the function $I(\cdot)$ is the indicator function that takes the value of 1 if the condition that it receives as an argument is satisfied, and 0 otherwise, and (ii) The time difference (in time slots) between two services of a packet flow j is fixed and equals $T/w_j$, i.e. $S_i=j$ iff $S_{(i+(T=w_j)) \mod T}=j$.

As just an example, in an embodiment in which k=2, and $W=\{1, 2\}$, a schedule $S=\{S_0, S_1, S2, S_3\}=\{1, 2, \emptyset, 2\}$ has a period of T=4 time slots, wherein $\emptyset$ denotes an empty time slot. The schedule S is an MPLLS schedule that satisfies conditions (i) and (ii) described above because each packet flow j (for $j \in [1, 2]$) is served exactly $w_j$ times in a time period of T slots. In particular, packet flow 1 is served every $T/w_1=4/1=4$ time slots while packet flow 2 is served every $T/w_2=4/2=2$ time slots, in this example embodiment and scenario. In this schedule S, one time slot in each time period of T=4 slots is an empty slot. A schedule of T=3 time slots, with fixed time intervals between consecutively scheduled time slots for each of the packet flows, cannot be obtained, in this example embodiment. For example, in such schedules, including schedules (1, 2, 2), (2, 1, 2) and (2, 2, 1), the time difference between two consecutive services for the second packet flow cannot be fixed. Further, a time period of less than 3 time slots cannot be obtained in this example scenario because $w_1+w_2=1+2=3$. Accordingly the optimal time period Topt is equal to 4 time slots, in this example embodiment and scenario.

Generally speaking, the optimal time period Topt is a multiple of the least common multiplier of the set W of weights w corresponding to k packet flows being scheduled in the periodic schedule, according to an embodiment. According to an embodiment, for a given set of weights $W=\{w_1, \ldots, w_k\}$, let L=least common multiplier $(w_1, \ldots, w_k)$, i.e. the minimal positive integer that divides wj, $\forall j \in [1, k]$. The optimal period Topt satisfies (i) $Topt \geq \Sigma_{j=1}^{k} w_j$.
(ii) $L=lcm(w_1, \ldots, w_k) | TOPT$, i.e. Topt is a multiple of L.
(iii)

$$Topt \geq L \cdot \left\lceil \frac{\sum_{j=1}^{k} w_j}{L} \right\rceil,$$

and in particular $Topt \geq L=lcm(w_1, \ldots, w_k)$.

Consider a schedule with a time period of Topt. Since packet flow j is served exactly $w_j$ times in each TOPT time slots and at most one packet flow is served in each time slot, it follows that $Topt \geq \Sigma_{j=1}^{k} w_j$. Further, because a packet flow j is served with fixed time differences and $w_j|Topt$ for all $w_j$, it follows that $L|Topt$. Generally, the complexity of finding an optimal solution to the MLPPS problem is NP-hard, in at least some embodiments and scenarios. In some embodiments, using various techniques described herein, the scheduler module 32 is configured to determine a schedule that approximates the optimal solution to the MLPPS problem.

For example, in an embodiment, the scheduler module 32 is configured to determine a schedule having the optimal period Topt multiplied by an integer n, resulting in an n-th approximation of the optimal solution to the MLPPS problem. For example, let $W^1, \ldots, W^d$ be d sets of distinct weights, such that for $i \in [1, d]$ the set $W^i$ has the $|W^i|=k_i$ weights $\{w_1^i, w_2^i, \ldots, w_{k_i}^i\}$. Further, let $A^1, \ldots, A^d$ be d schedules having the same time period L, such that for $i \in [1, d]$ $A^i = \{A_0^i, A_1^i, \ldots, A_{L-1}^i\}$ is a schedule of $k_i$ flows with weights of $W^i = \{w_1^i, w_2^i, \ldots, w_{k_i}^i\}$. A schedule for $k = \Sigma_{d=1}^{k} k_i$ flows with their corresponding weights $W = \tilde{W} = \bigcup_{i=1}^{d} W^i = \{w_1^1, \ldots, w_{k_1}^1, \ldots, w_1^i, \ldots, w_{k_i}^i, \ldots, w_1^d, \ldots, w_{k_d}^d\}$ with a time period of $T = d \cdot L$ time slots. In this case, $S = (S_0, S_1, S_{(d \cdot L)-1})$ is be obtained by defining $S_{(d \cdot L)-1} = A_i^{j+1}$ for $i \in [0, L-1]$, and $j \in [0, d-1]$. In other words, the schedule S interleaves the d schedules $A^1, \ldots, A^d$ according to $S_{(d \cdot L)-1} = A_i^{j+1}$, in an embodiment.

Due to the construction of the schedule S described above, the schedule S has a time period that equals the sum of the time periods for the d schedules A1, ..., Ad. Since each of the time slots in these d schedules, appear exactly once in S, each flow is served the required number of time according to its weight as in the schedule A that served the corresponding flow. Further, the time differences between two serves of the same flow are fixed and equal d times the fixed time difference that was observed in the schedule A of time period L that served the flow. For example, a packet flow served by a schedule $A^h$ with time differences of $L/w_h^i$ and is not served by any of the other schedules $A^1, A^2, \ldots, A^{h-1}, A^{h+1}, \ldots, A^d$. Accordingly, in the schedule $S = (S_0, S_1, \ldots, S_{T-1})$, the schedule $A^h$ appears only in time slots with indices $i \cdot d + j$ for $j = (h-1)$, i.e. every d time slots. Accordingly, in the schedule S of $T = d \cdot L$ time slots, a particular packet flow is served every $(L/w_h^i) \cdot d = ((d \cdot L)/w_h^i) = (T/w_h^i)$ time slots, thereby satisfying the weight requirement of the corresponding packet flow.

As an example, in an example embodiment in which the number of packet flows $k=4$ and the corresponding weights w are given by $W = \{w_1, w_2, w_3, w_4\} = \{2, 3, 3, 1\}$, $L = lcm(w_1, \ldots, w_k) = lcm(2, 3, 3, 1) = 6$. The presented above schedule will have a time period of $T = k \cdot L = 4 \cdot 6 = 24$ time slots. For these weights, the scheduler module 32 determines the schedules $A^1, \ldots, A^k = 4$, each of $L = 6$ time slots as described above. In this case, $A^1 = (A^{10}, A^{11}, \ldots, A^{L-1} = 5) = (1, 518, \emptyset, 1, \emptyset, \emptyset)$, $A^2 = (2, \emptyset, 2, \emptyset, 2, \emptyset)$, $A^3 = (3, \emptyset, 3, \emptyset, 3, \emptyset)$, $A^4 = (4, \emptyset, \emptyset, \emptyset, \emptyset, \emptyset)$. The scheduler module 32 then determines a periodic schedule $(S_0, S_1, \ldots, S_{T-1})$ with $T = k \cdot L = 24$ time slots in which $S_{i \cdot k + j} = A_i^{j+1}$ for $i \in [0, L-1=5]$, $j \in [0, k-1=3]$. Accordingly, in this example embodiment, the scheduler module 32 determines a periodic schedule $S = (1, 2, 3, 4, \emptyset, \emptyset, \emptyset, \emptyset, \emptyset, 2, 3, \emptyset, 1, \emptyset, \emptyset, \emptyset, \emptyset, 2, 3, \emptyset, \emptyset, \emptyset, \emptyset, \emptyset)$. In this schedule S, a packet flow j is served exactly $w_j$ times with time intervals of exactly $T/w_j = 24/w_j$ time slots, in this example embodiment.

In some embodiments and/or scenarios, the scheduler module 32 schedules access to the port 15 for more than a single packet flow in a single schedule $A_j$ (for some j) of L time slots. For example, in some embodiments, the scheduler module 32 is configured to determine a number n of schedules A, wherein the number n is less than the number k of packet flows to be schedules in a schedule S, and then determines the schedule S by interleaving the determined schedules A, e.g., according to $S_{(d \cdot L)-1} = A_i^{j+1}$, in various embodiments and/or scenarios. Accordingly, in such embodiments and/or scenarios, the required number of such schedules of L time slots is relatively smaller compared to the number of packet flows k. For example, in one such embodiment, a single schedule is determined to serve packet flows having identical weights w. In an embodiment, the scheduler module 32 identifies, in a set W of weights w corresponding to k packet flows that are to be granted access to the port 15 in each period of a periodic schedule, two or more weights of an identical value $w_j$. In an embodiment, the scheduler module 32 is configured to identify a most $L/w_j$ such packet flows having identical weight $w_j$. The scheduler mode 32 then determines a schedule A of L time slots in which the identified two or more packet flows corresponding to the identified two or more identical weights of the identical values $w_j$ are served, in an example embodiment. For example, in an embodiment, to serve up to $L/w_j$ packet flows, first $L/w_j$ time slots are allocated to a first packet flow having weight with the next time slots the same flow that was served $L/w_j$ time slots earlier. Let $w_{max} = \max(w_1, \ldots, w_k)$ be the maximal value of weight. For $w \in [1, w_{max}]$, let $n_w$ denote the number of flows with a weight of exactly w. In this case, $\Sigma_{w=1}^{w_{max}} n_w = k$. In an embodiment, the scheduler module 32 determines exactly $$\lceil \frac{n_w}{L/w} \rceil = \lceil \frac{w \cdot n_w}{L} \rceil$$

schedules A of time period of L to serve the $n_w$ flows with a weight of w. The total number of required schedules of L time slots for the k flows is $$\sum_{w=1}^{w_{max}} \lceil \frac{w \cdot n_w}{L} \rceil \leq k,$$

in this embodiment. Accordingly, in this case, the scheduler module 32 determines a periodic schedule of a time period $$T = L \cdot \sum_{w=1}^{w_{max}} \lceil \frac{w \cdot n_w}{L} \rceil.$$

Further, it follows that in a general case, for a given set of weights $W = \{w_1, \ldots, w_k\}$, a schedule with period T that satisfies $$T/Topt \leq \left( \sum_{w=1}^{w_{max}} \lceil \frac{w \cdot n_w}{L} \rceil / \sum_{i=1}^{k} w_i / L \right)$$

can be determined.

As an example, in an embodiment and scenario in which $k=4$, and $W = \{w_1, w_2, w_3, w_4\} = \{2, 3, 3, 1\}$. In this example embodiment and scenario, $w_2 = w_3 = 3$, and the two corresponding packet flows can be served in a single schedule of L time slots. For example, if $A^1, A^2, A^3$ are determined to be $A^1=(1, 0, 0, 1, 0, 0)$, $A^2=(2, 3, 2, 3, 2, 3)$, and $A^3=(4, 0, 0, 0, 0, 0)$, then a schedule $S=(S_0, S_1, \ldots, S_{T-1})$ is obtained with a period of $T=3L=18$ time slots. In an embodiment, a schedule S is determined by interleaving the schedules $A^1$, $A^2$, $A^3$ according to $S_{i\cdot 3+j}=A_i^j$ for $i\in[0, L-1=5]$, $j\in[0, 2]$ to obtain $S=(1, 2, 4, 0, 3, 0, 0, 2, 0, 1, 3, 0, 0, 2, 0, 0, 3, 0)$.

In some embodiments, the scheduler module 32 is configured to determine a schedule having a period L in which two or more packet flows at least some of which have non-identical weights w are served. For example, consider a set of k weights $W=\{w_1, \ldots, w_k\}$ with $L=\text{lcm}(w_1, \ldots, w_k)$. Assume that the weights W can be partitioned into d disjoint sets $W_1, \ldots, W_d$ that satisfy $\forall i\in[1, d]$ that $|W_i|\cdot\text{lcm}(W_i)\leq L$. Then, for the flows with weights W, a schedule with a time period of $d\cdot L$ time slots can be determined. In other words, for $i\in[1, d]$, there exists a schedule of L time slots that serves the flows with the weights of $W_i$. For example, consider $|W_i|$ schedules of $\text{lcm}(W_i)$ time slots in which a single flow is served in each schedule, and add to these $|W_i|$ schedules $(L/\text{lcm}(W_i)-|W_i|)\geq 0$ additional schedules, each having number of $\text{lcm}(W_i)$ time slots that contain only empty time slots. By interleaving, for each $W_i$ the $|W_i|+(L/\text{lcm}(W_i)-|W_i|)=L/\text{lcm}(W_i)$ schedules having $\text{lcm}(W_i)$ time slots, the required schedule of L time slots for the weights of $W_i$ is obtained. Interleaving these d schedules of L time slots for $W_1, \ldots, W_d$ results in a schedule for W with $d\cdot L$ time slots.

In a more specific example, according to an embodiment, $k=4$, $W=\{w_1, w_2, w_3, w_4\}=\{2, 3, 3, 1\}$ and $L=6$. In this case, for $d=2$, $W_1=\{w_1, w_4\}=\{2, 1\}$, $W_2=\{w_2, w_3\}=\{3, 3\}$. Further, $|W_1|\cdot\text{lcm}(W_1)=2\cdot 2=4\leq 6=L$, $|W_2|\cdot\text{lcm}(W_2)=2\cdot 3=6\leq 6=L$, in this embodiment. Accordingly, the first and the last flows can be served within a first schedule of L time slots, and the second and the third flows can be served in a second schedule of L time slots. In this case, by interleaving the $d=2$ schedules $A_1=(1, 4, 0, 1, 0, 0)$, $A_2=(2, 3, 2, 3, 2, 3)$, a schedule $S=(1, 2, 4, 3, 0, 2, 1, 3, 0, 2, 0, 3)$ is obtained. The time period of the schedule S is $T=2\cdot 6=12$ time slots, in this embodiment. This time period is an optimal time period since $T_{opt}\geq L\cdot\lceil\sum_{i=1}^{k}w_i/L\rceil=6\cdot\lceil(2+3+3+1)/6\rceil=12$, in an embodiment.

In another embodiment and/or scenario, in which $W=\{w_1, \ldots, w_k\}$ are all powers of some integer $X\in N+$, an optimal schedule with the optimal time period $T_{opt}$ can be determined. Assume without loss of generality that $w_1, \ldots, w_k$ are ordered in an increasing order and that (for $j\in[1, k])w_j=X^{p_j}$ for some integer $p_j$. For $p\in[p_1, p_k]$, let $W^p$ be a subset of weights $w_j$ of a set W, having values of at most $X^p$, i.e. $W^p=\{w_j=X^{p_j}\in W|p_j\leq p\}$. In this case, the following conditions are true with respect to the k packet flows:

(i) the flows with the weights $W^p$ can be served by d schedules, each of $X^p$ time slots for $$\left\lceil \frac{\sum_{w_j\in wP^{w_j}}}{X^p} \right\rceil,$$

and (ii) there exist such d schedules such that the total number of empty time slots is less than $X^p$ and if such empty time slots exist, they all appear in a single schedule.

For $p=p_1$, $|W^p|\geq 1$ and all the weights in $W^p$ equal $X^p$. Let $k_p=|W^p|$. The corresponding $k_p$ flows can be served by $d=k_p$ schedules, each with $X^p$ time slots serving a particular flow with a weight of $X^p$. Here, the number of schedules A is $$d = k_p = \left\lceil \frac{k_p\cdot X^p}{X^p} \right\rceil = \left\lceil \frac{\sum_{w_j\in wP^{w_j}}}{X^p} \right\rceil,$$

in an embodiment. Further, these schedules A do not include any empty time slots, in an embodiment. For a general case of $p\in[p_{1+1}, p_k]$, consider $W^p$ and $W^{p-1}$ having $k_p$ and $k_{p-1}$ weights, respectively. If $W^p=W^{p-1}$ (i.e. $\{w_j=X^{p_j}\in W|p_j=p\}=\emptyset$), consider schedules of $X^p$ time slots obtained by interleaving X consecutive schedules of $X^{p-1}$ time slots for $W_{p-1}$. If the number of schedules for $W^{p-1}$ is not a multiple of X, then up to $X-1$ additional schedules with $X^{p-1}$ time slots containing only empty time slots can be added to these schedule. The number of time slots in each interleaved schedule is then $X\cdot X^{p-1}=X^p$. Only the last schedule, of the schedules for $W^{p-1}$ or of the added $X-1$ schedules, may include empty time slots). Accordingly, the total number of empty time slots $n_\emptyset$ is at most $n_\emptyset\leq(X^p-1)$ and $$d = \left(n_\emptyset + \sum_{w_j}\in wP^{w_j}\right)/X^p = \left\lceil \frac{\sum_{w_j\in wP^{w_j}}}{X^p} \right\rceil.$$

As another example, consider k flows with weights $w_1, \ldots, w_k$. Assume that $\exists X\in N+$ such that (for $j\in[1, k])w_j=X^{p_j}$ for some integer $p_j$. In this case, (i) $L=\text{lcm}(w_1, \ldots, w_k)=\max(w_1, \ldots, w_k)$, and (ii) the optimal time period $T_{opt}$ satisfies $T_{opt}=L\cdot\lceil\sum_{i=1}^{k}w_i/L\rceil$. Assume again without loss of generality an increasing order of $w_1, \ldots, w_k$. Then, $\max(w_1, \ldots, w_k)=w_k=X^{p_k}$ and $\forall j\in[1, k]$, $X^{p_j}|X^{p_k}$. Accordingly, $L=\text{lcm}(w_1, \ldots, w_k)=\max(w_1, \ldots, w_k)=w_k=X^{p_k}$. Consider $$d = \left\lceil \frac{\sum_{w_j}\in wP^{w_j}}{X^p} \right\rceil = \left\lceil \frac{\sum_{w_j}\in wP^{w_j}}{L} \right\rceil.$$

schedules, each having a time periods of $L=X^{p_k}$ time slots for $W^p=W$. By interleaving these d schedules, a valid MLPPS schedule is obtained for W, the schedule having a time period of $T=d\cdot L=L\cdot\lceil\sum_{i=1}^{k}w_i/L\rceil$. Further, because $T_{opt}\geq L\cdot\lceil\sum_{i=1}^{k}w_i/L\rceil$, this schedule is an optimal schedule with $T_{opt}=L\cdot\lceil\sum_{i=1}^{k}w_i/L\rceil$ time slots.

As a more specific example, in one example embodiment and scenario, $k=5$ and $W=\{w_1, \ldots, w_k\}=\{2, 4, 4, 4, 16\}=\{X^1, X^2, X^2, X^2, X^4\}$ for $X=2$. In this case, $L=\text{lcm}(w1, \ldots, wk)=\max(w1, \ldots, wk)=X4=16$. The first flow with weights $W^1=\{X^1\}=\{2\}$ can be scheduled in $d=\lceil\sum_{w_j\in W^1}w_jX^1\rceil=\lceil X^1/X^1\rceil=1$ schedule, $S=(1, 1)$, having a period of $X^1=2$ time slots. For $W^2=\{2, 4, 4, 4\}$, the first schedule of $X^1=2$ time slots is interleaved with a schedule of $X^1=2$ empty time slots to obtain one schedule of $X2=4$ time slots $(1, 0, 1, 0)$ for the first flow, in an embodiment. By adding three additional schedules of $X^2=4$ time slots $(2, 2, 2, 2)$, $(3, 3, 3, 3)$, $(4, 4, 4, 4)$ for the next three flows, the first four flows are served in $\lceil\sum_{w_j\in W^1}w_j/X^2\rceil=\lceil(2+4+4+4)/4\rceil=$such schedules. Next, for $W^3$, two pairs of these four schedules are interleaved to obtain $\lceil\sum_{w_j\in W^1}w_j/X^3\rceil=\lceil(2+4+4+4)/8\rceil=2$ schedules $(1, 2, 0, 2, 1, 2, 0, 2)$ and $(3, 4, 3, 4, 3, 4, 3, 4)$, each having $X^3=8$ time slots. For $W^4=W$, interleaving these two schedules and adding another schedule for the last flow with a weight of $X^4$ results in two schedules of $X^4$ time slots $(1, 3, 2, 4, 0, 3, 2, 4, 1, 3, 2, 4, 0, 3, 2, 4) and (5, 5, 5, 5, 5, 5, 5, 5, 5, 5, 5, 5, 5, 5, 5, 5). Finally, these last two schedules are interleaved to obtain the schedule (1, 5, 3, 5, 2, 5, 4, 5, 0, 5, 3, 5, 2, 5, 4, 5, 1, 5, 3, 5, 2, 5, 4, 5, 0, 5, 3, 5, 2, 5, 4, 5) with a time period of Topt=L·⌈$\sum_{i=1}^{k} w_i/L$⌉=16·⌈(2+4+4+4+16)/16⌉=16·2=32 time slots, in an embodiment In yet another example embodiment and scenarios, k weights are distinct prime numbers greater than 0. Without loss of generality assume that $w_1, \ldots, w_k$ are ordered in an increasing order. In this case, L=lcm($w_1, \ldots, w_k$)=$\Pi_{j=1}^{k} w_j$ and $w_k \geq k$ For the sake of simplicity, assume that $k \geq 3$. For example, let $W_1=W\setminus\{w_k\}=\{w_1, \ldots, w_{k-1}\}$ and $W_2=\{w_k\}$. $W_1$ satisfies $|W_1| \cdot lcm(W_1)= (k-1) \cdot \Pi_{j=1}^{k} w_j \leq w_k \cdot \Pi_{j=1}^{k} w_j = \Pi_{j=1}^{k} w_j = L$. In this case, a schedule for W=$\{w_1, \ldots, w_k\}$ with a time period of T=2·L time slots is obtained by interleaving a schedule of the flows with weights in $W_1$ and another schedule for the single flow in $W_2$, each schedule having a time period of L.

In yet another embodiment, an optimal schedule is determined for the case of k flows for which the weights are prime numbers. In an embodiment, an optimal schedule $S=(S_0, S_1, \ldots, S_{T-1})$ with a time period of T=Topt=L is obtained by the interleaving $w_k$ schedules $A^1, A^2, \ldots, A^{wk}$, each having $L/w_k = \Pi_{j=1}^{k} w_j$ time slots. Each of the first (k-1) schedules of $L/w_k$ time slots serves one flow such, e.g., for $j \in [1, k-1]$, a schedule Aj serves the jth flow exactly $w_j$ times, in an embodiment In addition, each of the $w_k$ schedules serves the last (kth) flow exactly once, in an embodiment After the interleaving process, the last (kth) flow will be served in S in the first time slot ($S_0$=k) and in additional time slots with time differences of $T/w_k=L/w_k=\Pi_{j=1}^{k} w_j$, i.e. in the time slots with indices $i \cdot \Pi_{j=1}^{k} w_j$ for $i \in [0, w_k-1]$. To show that these specific $w_j$ time slots in which a flow is served are obtained in the interleaving process (e.g., according to $S_{i \cdot k+j} = A_i^{j+1}$ for $i \in [0, (L/w_k)-1]$, $j \in [0, w_k-1]$) exactly once from each of the schedules $A^1, A^2, \ldots, A^{wk}$, assume by contradiction, existence of two such possible indices, both obtained from the same $A^{j+1}$ (for some $j \in [0, w_k-1]$), e.g. from the two time slots $A_{i1}^{j+1}$ and $A_{i2}^{j+1}$ in this schedule. In this case, the indices appear in $Si_1 \cdot w_k+j$ and $Si_2 \cdot w_k+j$ in the schedule S. The time difference between the indices in S is $(i_2 \cdot w_k+j)-(i_1 \cdot w_k+j)=(i_2-i_1) \cdot wk$. This time difference cannot be a multiple of $\Pi_{j=1}^{k} w_j$ (the fixed time difference for the corresponding flow) since the minimal number that divides $\Pi_{j=1}^{k} w_j$ as well as $w_k$ is T=L, the total time period of the schedule S.

By this contradiction, it follows that each of the $w_k$ schedules $A^1, A^2, \ldots, A^{wk}$ serves the last kth flow at most once. Since this flow is served a total number of $w_k$ times, the flow is served exactly once by each of these $w_k$ schedules. After determining in which time slots the last kth flow is served, a flow j ($j \in [1, k-1]$) can be served in the remaining $L/w_k-1$ time slots in $A^j$. Consider $(L/w_k)/w_j$ options for the first time the flow j is served among the first $(L/w_k)/w^j$ time slots in $A^j$. For each of these options, the flow j is continued to be served with time differences of $(L/w_k)/w_j$. The number of options is at least two since $k \geq 3$ and thus $(L/w_k)/w_j \geq 2$. Exactly one of these options will not be possible since one slot in $A^j$ was already set to serve the last flow. Any of the other options will be legal since each of these options uses only time slots that have not be used so far, and these options can be selected arbitrarily. Finally, after selecting the time slots in which all the flows are served, a schedule $S=(S_0, S_1, \ldots, S_{T-1})$ is obtained by interleaving $A^1, A^2, \ldots, A^{wk}$. The time period of the schedule S is $T=wk \cdot \Pi_{j=1}^{k} w_j=L$ time slots. Thus, an optimal schedule for the case of a set of $W=\{w_1, \ldots, w_k\}$ with $k \geq 3$ distinct prime numbers is obtained.

Figure 3:
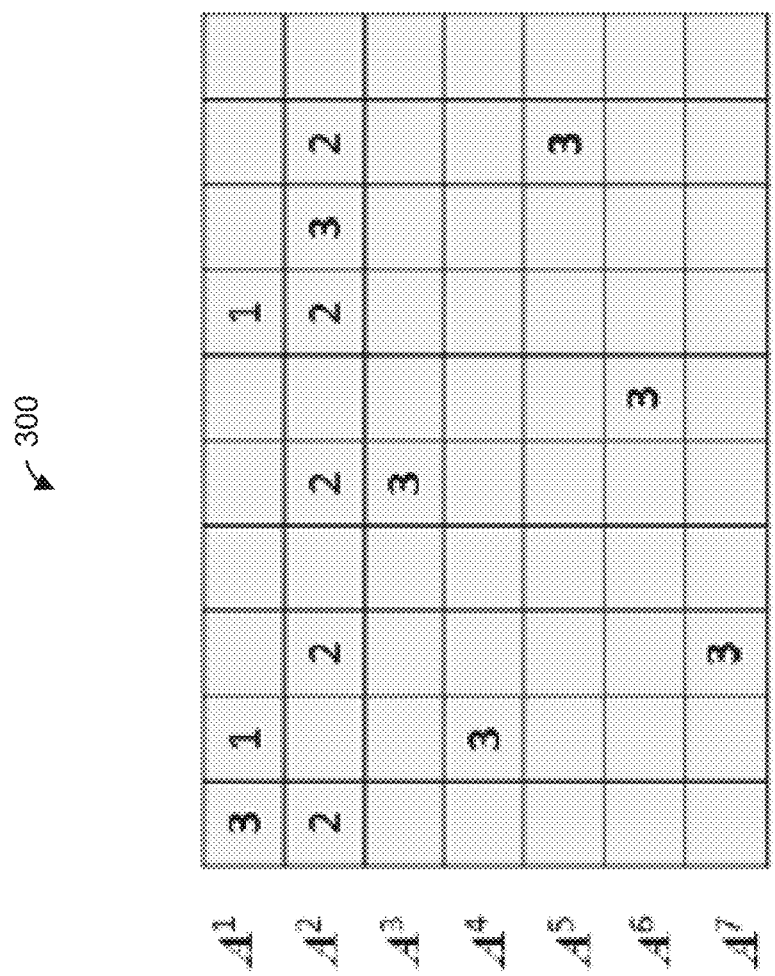
FIG. 3 is a diagram that illustrates a process of determining a schedule for packet flows having weights that are prime numbers, according to an example embodiment.

FIG. 3 is a diagram that illustrates a process of determining a schedule for k packet flows having weights w that are prime numbers, according to an example embodiment. In the illustrated embodiment, a schedule S is determined for a set of k=3 distinct prime weights $W=\{w_1, \ldots, w_k\}=\{2, 5, 7\}$. In an embodiment, the schedule S is obtained with a time period of $T=L=lcm(w_1, \ldots, w_k)=2 \cdot 5 \cdot 7=70$ time slot, illustrated as a matrix of $w_k=7$ rows and $(L/w_k)=w_1 \cdot w_2=2 \cdot 5=10$ columns. The $w_k$ rows illustrates $A^1, A^2, \ldots, A^{wk}=7$ each of $(L/w_k)=10$ time slots. First, the last third flow is set to be served in S exactly $w_k=7$ times in time differences of $(L/w_k)=10$ starting from the first time slot. Accordingly, in this case, $S_0=S_{10}=S_{20}=S_{30}=S_{40}=S_{50}=S_{60}=k=3$. The $w_k=7$ matching time slots in $A^1, A^2, \ldots, A^{wk}=7$ are indicated in FIG. 3 by the number "3". These matching time slots appear in $w_k$ different rows, in the illustrated embodiment. Next, the first flow having $w_1=2$ is served in $A^1$ and the second flow with $w_2=5$ is served in $A^2$. For the first flow, there are $(L/w_k)/w_1=(70/10)/2=5$ options for the first time slot it is served in $A^1$. The five options are $A^{10}, A^{11}, A^{12}, A^{13}, A^{14}$, in the illustrated embodiment. In an embodiment, because the first schedule $A^{10}$ is already set to serve the last flow, the next time slot is selected to serve the first flow and set $A^{11}=1$. Because the time difference of $(L/w_k)/w_1=5$ time slots for this flow in $A^1$, set $A^{16}$ is set to $A^{16}1$.

Continuing with the same embodiment, for the second flow with $w_2=5$, $A^{27}=3$ and $A^{20}$ is set to equal $A^{22}=A^{24}=A^{26}=A^{28}=2$. Then, an optimal schedule S is determined by taking the interleaving of $A^1, A^2, \ldots, A^{wk}=7$. The time period og the determined schedule is Topt=L=2·5·7=70 and includes $Topt-w_1-w_2-w_3=70-2-5-7=56$ empty time slots.

Figure 4:
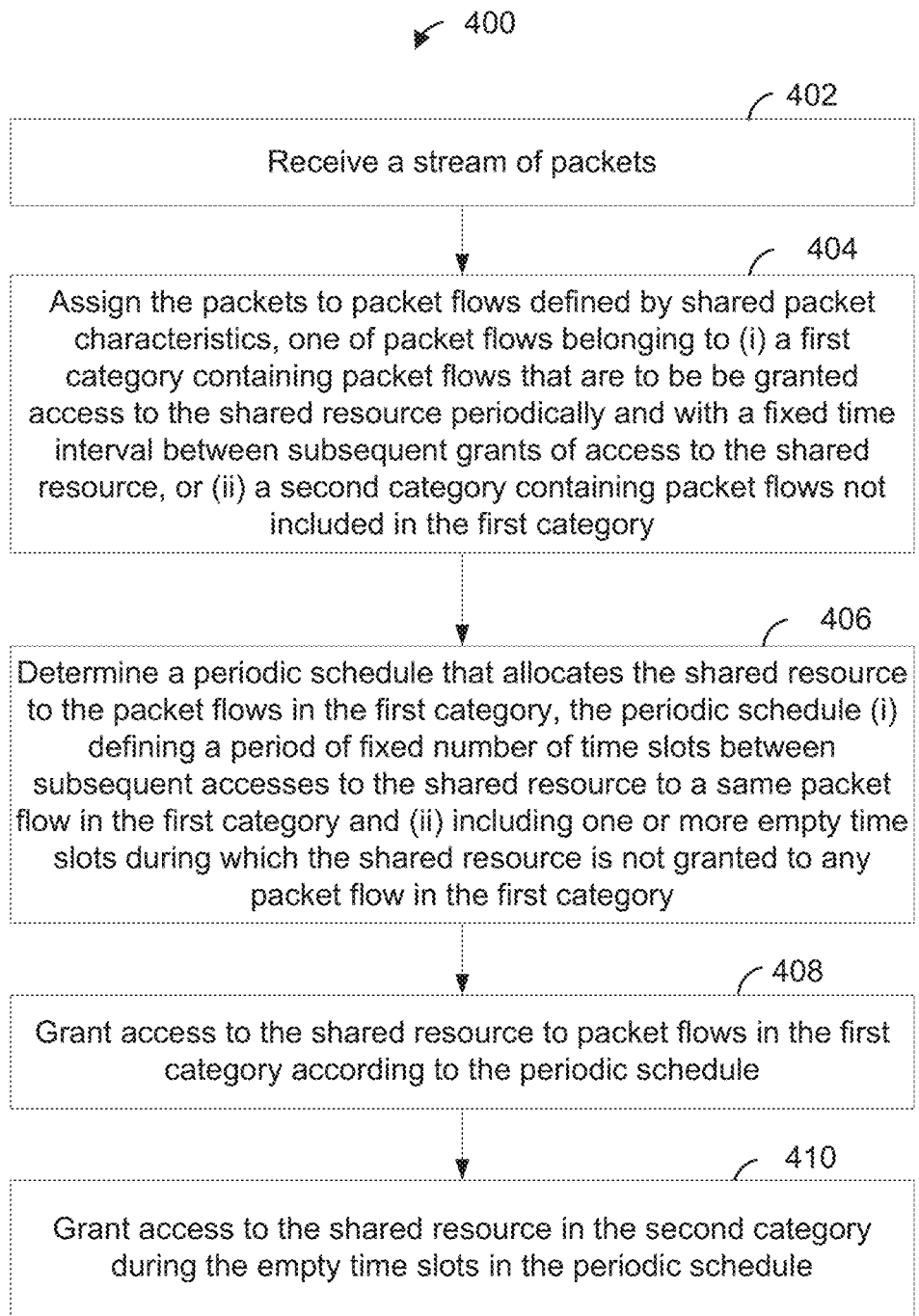
FIG. 4 is a flow diagram of an example method for allocating a shared resource, such as an egress port, to a plurality of packet flows in a network device, according to an embodiment.

FIG. 4 is a flow diagram of an example method 400 for allocating a shared resource, such as an egress port, to a plurality of packet flows in a network device, according to an embodiment. In an embodiment, the method 400 is implemented by a network device such as network device 10 of FIG. 1, for example. More specifically, in an embodiment, at least a portion of the method 400 is implemented by a scheduler such as scheduler module 32 of FIG. 1, for example.

At block 402, a stream of packets is received at an ingress port of a network device. At block 404, the packets received at block 402 are assigned to packet flows. In an embodiment, the packet flows are defined by shared packet characteristics. In an embodiment, ones of packet flows belong to a first category of packet flows or a second category of packet flows. In an embodiment, the first category of packet flows contains packet flows that are to be granted access to the shared resource periodically and with a fixed time interval between subsequent of access to the shared resource. On the other hand, the second category of packet flows contains packet flows that do not have a periodic and/or fixed interval scheduling requirement and, accordingly, are not included in the first category of packet flows, in an embodiment.

At block 406, a periodic schedule that allocates the shared resource to the packet flows of the first category is determined. The periodic schedule determined at block 406 (i) defines a period of fixed number of time slots between subsequent accesses to the shared resource to a same packet flow in the first category, and (ii) includes one or more empty time slots during which the shared resource is not allocated to any packet flow in the first category of packet flows. In various embodiments, the periodic schedule is determined at block 406 is determined so as to minimize a length of the time period of the periodic schedule, for example using various techniques described herein. In an embodiment, the periodic schedule is determined so as to minimize the number of empty time slots in the periodic schedule.

At block 408, access to the shared resource is granted to packet flows in the first category according to the periodic schedule determined at block 406.

At block 410, access to the shared resource is granted to packet flows in the second category. The shared resource is granted to packet flows in the second category during the empty time slots of the periodic schedule determined at block 409, in an embodiment. Utilizing the empty time slots of the periodic schedule, determined to accommodate periodicity and fixed interval requirements of packet flows in the first category, to the packet flows in the second category generally diminishes or eliminates inefficiency associated with empty time slots that are needed to accommodate requirements of packet flows in the first category, in at least some embodiments.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While various embodiments have been described with reference to specific examples, which are intended to be illustrative only and not to be limiting, changes, additions and/or deletions may be made to the disclosed embodiments without departing from the scope of the claims.

What is claimed is:

1. A method for allocating a shared resource in a network device, the method comprising:
   receiving a stream of packets at the network device;
   assigning the packets to packet flows defined by shared packet characteristics, ones of the packet flows belonging to (i) a first category containing packet flows that are to be granted access to the shared resource periodically and with a fixed time interval between subsequent grants of access to the shared resource, or (ii) a second category containing packet flows not included in the first category;
   determining a periodic schedule that allocates the shared resource to the packet flows in the first category, the periodic schedule (i) defining a period of a fixed number of time slots between subsequent accesses to the shared resource granted to a same packet flow in the first category and (ii) including one or more empty time slots during which the shared resource is not granted to any packet flow in the first category;
   granting access to the shared resource to packet flows in the first category according to the periodic schedule, including granting access to up to one packet flow per time slot in the periodic schedule; and
   granting access to the shared resource to packet flows in the second category during the empty time slots in the periodic schedule;
   wherein determining the periodic schedule comprises:
      determining respective schedules corresponding to respective packet flows in the first category, and
      interleaving the respective determined schedules to determine the periodic schedule.

2. The method of claim 1, wherein:
   packet flows in the first category are associated with one or more first priority levels; and
   packet flows in the second category are associated with one or more second priority levels, the one or more second priority levels lower than the one or more first priority levels.

3. The method of claim 1, wherein determining the periodic schedule that allocates the shared resource to the packet flows in the first category comprises:
   receiving a set W of k weights corresponding to k packet flows, wherein k is a positive integer greater than zero, the set W of k weights including respective weights w defining respective numbers of times ones of packet flows are to be granted access to the shared resource in a single period of the periodic schedule;
   determining a least common multiplier (lcm) L of the set W of respective weights w; and
   determining the periodic schedule having a period of n·L, wherein n is a positive integer greater than zero.

4. The method of claim 3, wherein determining the periodic schedule includes:
   determining the respective schedules corresponding to the respective packet flows in the first category, ones of the respective schedules having a period of L and allocating w time slots to respective packet flows according to corresponding weights w in the set W; and
   determining the periodic schedule by interleaving the respective determined schedules.

5. The method of claim 3, wherein determining the periodic schedule includes
   identifying two or more packet flows, of the plurality of packet flows, having identical weights w; and
   determining the respective schedules corresponding to the respective packet flows in the first category, including determining a single schedule, having a period of L, corresponding to the identified two or more packet flows; and
   determining the periodic schedule by interleaving the determined respective schedules.

6. The method of claim 3, wherein determining the periodic schedule includes:
   partitioning the set W into d disjoint sets $W_1, \ldots, W_d$ that satisfy $|W_i| \cdot \text{lcm}(W_i) \leq L$, wherein d is an integer greater than or equal to two, $|W_i|$ is the number of elements in the i-th set of the d disjoint sets, and $\text{lcm}(W_i)$ is the least common multiple of the i-th set of the d disjoint sets; and
   determining d schedules, respective schedules of the d schedules having a period of L and allocating time slots to packet flows corresponding to weights w included in respective disjoint sets $W_1, \ldots, W_d$; and
   determining the periodic schedule by interleaving the determined d schedules.

7. The method of claim 3, wherein the weights w in the set W are powers of an integer X, and wherein determining the periodic schedule comprises determining a schedule having a period of $L\lceil\sum_{j=1}^{k}w_i/L\rceil$, wherein j is an index to the k packet flows, i is an index to the set W, and $\lceil\;\rceil$ represents a ceiling function.

8. The method of claim 3, wherein the weights w in the set W are distinct prime positive integers, and wherein determining the periodic schedule comprises determining a schedule having a period of 2L.

9. The method of claim 3, wherein the weights w in the set W are distinct prime positive integers, and wherein determining the periodic schedule comprises determining a schedule having a period of L.

10. A network device, comprising:
an ingress port configured to receive a stream of packets;
a packet classifier module configured to assign the packets to packet flows defined by shared packet characteristics, ones of the packet flows belonging to (i) a first category containing packet flows that are to be granted access to the shared resource periodically and with a fixed time interval between two subsequent grants of access to the shared resource, or (ii) a second category containing packet flows not included in the first category; and
a scheduler module configured to:
determine a periodic schedule that allocates the shared resource to the packet flows in the first category, the periodic schedule (i) defining a period of a fixed number of time slots between subsequent accesses to the shared resource granted to a same packet flow in the first category and (ii) including one or more empty time slots during which the shared resource is not granted to any packet flow in the first category,
grant access to the shared resource to packet flows in the first category according to the periodic schedule, including granting access to up to one packet flow per time slot in the periodic schedule, and
grant access to the shared resource to packet flows in the second category during the empty time slots in the periodic schedule;
wherein the scheduler module is further configured to determine respective schedules corresponding to respective packet flows in the first category, and interleave the respective determined schedules to determine the periodic schedule.

11. The network device of claim 10, wherein:
packet flows in the first category are associated with one or more first priority levels; and
packet flows in the second category are associated with one or more second priority levels, the one or more second priority levels lower than the one or more first priority levels.

12. The network device of claim 10, wherein the scheduler module is configured to:
receive a set W of k weights corresponding to k packet flows, wherein k is a positive integer greater than zero, the set W of k weights including respective weights w defining respective numbers of times ones of packet flows are to be granted access to the shared resource in a single period of the periodic schedule; and
determine a least common multiplier (lcm) L of the set W of respective weights w;
determine the periodic schedule to have a period of n·L, wherein n is a positive integer greater than zero.

13. The network device of claim 12, wherein the scheduler module is configured to:
determine the respective schedules corresponding to the respective packet flows in the first category, ones of the respective schedules having a period of L and allocating w time slots to respective packet flows according to corresponding weights w in the set W; and
determine the periodic schedule by interleaving the respective schedules corresponding to respective packet flows in the first category.

14. The network device of claim 12, wherein the scheduler module is configured to:
identify two or more packet flows, of the plurality of packet flows, having identical weights w;
determine the respective schedules corresponding to the respective packet flows in the first category, including determining a single schedule having the period of L and allocating number of time slots w to each of the identified packet flows; and
determine the periodic schedule by interleaving the respective schedules corresponding to respective packet flows in the first category.

15. The network device of claim 12, wherein the scheduler module is configured to:
partition the set W of weights w into d disjoint sets $W_1, \ldots, W_d$ that satisfy $|W_i|\cdot\mathrm{lcm}(W_i)\leq L$, wherein d is an integer greater than or equal to two, $|W_i|$ is the number of elements in the i-th set of the d disjoint sets, and $\mathrm{lcm}(W_i)$ is the least common multiple of the i-th set of the d disjoint sets;
determine d schedules, respective schedules of the d schedules having a period of L and allocating time slots to packet flows corresponding to weights w included in respective disjoint sets $W_1, \ldots, W_d$; and
determine the periodic schedule by interleaving the determined schedules.

16. The network device of claim 12, wherein the weights w in the set W are powers of an integer X, and wherein the scheduler module is configured to determine the periodic schedule by determining a schedule having a period of $L\lceil\sum_{j=1}^{k}w_i/L\rceil$, wherein j is an index to the k packet flows, i is an index to the set W, and $\lceil\;\rceil$ represents a ceiling function.

17. The network device of claim 12, wherein the weights w in the set W are distinct prime positive integers, and wherein the scheduler module is configured to determine the periodic schedule by determining a schedule having a period of 2L.

18. The network device of claim 12, wherein the weights w in the set W are distinct prime positive integers, and wherein the scheduler module is configured to determine the periodic schedule by determining a schedule having a period of L.

19. A method for allocating a shared resource in a network device, the method comprising:
determining a periodic schedule that allocates the shared resource to a plurality of clients, the periodic schedule (i) defining a period of fixed number of time slots between subsequent accesses to the shared resource by a same client of the plurality of clients and (ii) including at least some empty time slots during which access to the shared resource is not granted to any client of the plurality of clients; and
granting access to the shared resource to ones of the plurality of clients according to the determined periodic schedule, including granting access to up to one client per time slot in the periodic schedule;
wherein determining the periodic schedule comprises:
determining respective schedules corresponding to the plurality of clients, and
determining the periodic schedule by interleaving the respective determined schedules.

20. A network device, comprising:
a shared resource; and
a scheduler module coupled to the shared resource, the scheduler module configured to:
determine respective schedules corresponding to the plurality of clients,
determine a periodic schedule that allocates the shared resource to a plurality of clients by interleaving the respective determined schedules, the periodic schedule (i) defining a period of fixed number of time slots between subsequent grants to a same client of the plurality of clients and (ii) including at least some empty time slots during which the resource is not granted to any client of the plurality of clients, and
grant access to the shared resource to ones of the plurality of clients according to the determined periodic schedule, including granting access to up to one client per time slot in the periodic schedule.

\* \* \* \* \*